(12) United States Patent
Iwahara et al.

(10) Patent No.: US 8,806,722 B2
(45) Date of Patent: Aug. 19, 2014

(54) CLIP

(75) Inventors: Toshio Iwahara, Okazaki (JP); Junya Ukai, Okazaki (JP)

(73) Assignee: Daiwa Kasei Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/302,825

(22) Filed: Nov. 22, 2011

(65) Prior Publication Data
US 2012/0131770 A1    May 31, 2012

(30) Foreign Application Priority Data

Nov. 25, 2010  (JP) ................................. 2010-262450

(51) Int. Cl.
*A44B 1/28* (2006.01)

(52) U.S. Cl.
USPC ............ 24/297; 24/453; 24/581.11; 411/508; 248/71

(58) Field of Classification Search
USPC .............. 24/297, 581.11, 453, 457, 458, 293, 24/289; 411/508, 913; 296/214, 1.08, 296/1.06; 293/128; 248/222.11, 222.12, 56, 248/71, 74.2
See application file for complete search history.

(56) References Cited

U.S. PATENT DOCUMENTS

| | | | |
|---|---|---|---|
| 2,815,182 A | 12/1957 | Mittag et al. | |
| 3,815,182 A | 6/1974 | Guard et al. | |
| 4,438,552 A * | 3/1984 | Omata | 24/704.1 |
| 4,840,334 A | 6/1989 | Kikuchi | |
| 5,775,861 A * | 7/1998 | Leon et al. | 411/344 |
| 6,119,316 A * | 9/2000 | Ishihara et al. | 24/297 |
| 6,243,928 B1 * | 6/2001 | Powell | 24/458 |
| 6,364,589 B1 * | 4/2002 | Wenglinski | 411/508 |
| 6,406,242 B1 * | 6/2002 | Gordon | 411/508 |
| 6,665,914 B2 * | 12/2003 | Ogawa | 24/297 |
| 6,691,380 B2 * | 2/2004 | Vassiliou | 24/295 |
| 6,857,168 B2 * | 2/2005 | Lubera et al. | 24/293 |
| 6,928,705 B2 * | 8/2005 | Osterland et al. | 24/295 |
| 7,096,638 B2 * | 8/2006 | Osterland et al. | 52/708 |
| 7,120,971 B2 * | 10/2006 | Osterland et al. | 24/295 |
| 7,231,696 B2 * | 6/2007 | Asano et al. | 24/297 |
| 7,257,867 B2 | 8/2007 | Mizukoshi et al. | |

(Continued)

FOREIGN PATENT DOCUMENTS

| | | |
|---|---|---|
| CN | 1707125 A | 12/2005 |
| DE | 29 21 956 A | 12/1980 |

(Continued)

*Primary Examiner* — Robert J Sandy
*Assistant Examiner* — Abigail Morrell
(74) *Attorney, Agent, or Firm* — Christensen Fonder P.A.

(57) ABSTRACT

A clip may include an anchor portion that is configured to be inserted into an insertion hole formed in a subject member. The anchor portion has at least a pair of pillars that are positioned across an axis of the anchor portion, and flexible strips that are respectively connected to the pillars so as to be projected outward therefrom. The pillars are configured to be flexed about proximal ends thereof in a direction in which the pillars can intersect with each other. The flexible strips are configured to engage a periphery of the insertion hole formed in the subject member when the anchor portion is inserted into the insertion hole, so as to hold the anchor portion on the subject member with a retention force. The pillars can be applied with a flexing force when an extraction force greater than the retention force of the anchor portion is applied to the anchor portion, so as to be flexed in the direction in which the pillars can intersect with each other.

2 Claims, 9 Drawing Sheets

(56) References Cited

U.S. PATENT DOCUMENTS

| | | | |
|---|---|---|---|
| 7,267,361 B2 * | 9/2007 | Hofmann et al. | 280/728.2 |
| 7,444,721 B2 * | 11/2008 | Smith et al. | 24/297 |
| 2003/0079316 A1 * | 5/2003 | Ogawa | 24/297 |
| 2003/0189140 A1 * | 10/2003 | Takeuchi | 248/71 |
| 2004/0083582 A1 * | 5/2004 | Dickinson et al. | 24/295 |
| 2005/0217082 A1 * | 10/2005 | Vassiliou | 24/294 |
| 2008/0089741 A1 | 4/2008 | Legat et al. | |
| 2008/0313868 A1 * | 12/2008 | Kamiya et al. | 24/453 |

FOREIGN PATENT DOCUMENTS

| | | |
|---|---|---|
| JP | 4-41105 U | 4/1992 |
| JP | 11-93924 | 4/1999 |
| JP | 2005-155845 A | 6/2005 |
| JP | 2010-52590 | 2/2010 |
| WO | WO 2006/050774 A1 | 5/2006 |

* cited by examiner

CLIP

BACKGROUND OF THE INVENTION

1. Field of the Invention

The present invention relates to a clip that is attachable to a subject member (e.g., a vehicle body panel). More particularly, the present invention relates to a clip that is attachable to the subject member by inserting an anchor portion thereof into an insertion hole formed in the subject member.

2. Description of Related Art

This type of clip is already known. The clip includes an anchor (leg) portion (an engagement portion) that is inserted into an insertion hole formed in a subject member (e.g., a body panel), and a connecting portion (a head portion) that is capable of being connected to an attaching member (e.g., a door trim). The anchor portion can be designed in consideration of an insertion (push-in) load that is applicable thereto when it is inserted into the insertion hole of the subject member and a retention force (an engagement force against the insertion hole) that is required for the anchor (the clip). Conversely, the connecting portion can be formed or shaped in consideration of a type and a shape of the attaching member. Generally, the anchor portion includes a pillar that is integrated with the connecting portion, and a pair of flexible strips that are formed in a distal end of the pillar. The flexible strips are shaped to be outwardly spread toward a proximal end of the pillar.

In order to attach the attaching member (the door trim) to the subject member (the body panel), the connecting portion is connected to the attaching member. Thereafter, the anchor portion of the clip can be pushed into the insertion hole of the subject member by applying a desired insertion force (load), so as to be inserted into the insertion hole while each of the flexible strips are flexed inwardly. Upon insertion of the anchor portion, a portion (a shouldered portion) of each of the flexible strips can engage a periphery of the insertion hole, so that the anchor portion can be retained in the insertion hole with a desired retention force. As a result, the clip can be attached to the subject member. Thus, the attaching member can be attached to the subject member.

To the contrary, in order to remove or detach the attaching member from the subject member for maintenance or other such purposes, the anchor portion (the clip) can be applied with a removal or extraction force greater than the retention force thereof. Upon application of the extraction force, the flexible strips of the anchor portion can be disengaged from the periphery of the insertion hole formed in the subject member. As a result, the anchor portion can be extracted from the insertion hole, so that the clip can be removed from the subject member. Thus, the attaching member can be removed from the subject member.

The removed clip can be used repeatedly. Therefore, in order to attach the attaching member to the subject member again, the anchor portion of the clip can be pushed into the insertion hole of the subject member in the same manner as above. Further, examples of such a repeatedly-usable clip are taught, for example, by Japanese Laid-Open Patent Publication Nos. 11-93924 and 2010-25290.

Generally, the flexible strips of the anchor can be abraded or worn away by repeated-use of the clip. In particular, when the clip is made of low-cost resins such as polyacetal (e.g., polyoxymethylene (POM)), the flexible strips of the anchor portion can be easily abraded or worn away by the repeated-use of the clip. This may lead to a decrease in the retention force of the anchor portion.

Thus, there is a need in the art for improved clips.

SUMMARY OF THE INVENTION

For example, in one embodiment of the present invention, a clip may include an anchor portion that is configured to be inserted into an insertion hole formed in a subject member. The anchor portion has at least a pair of pillars that are positioned across an axis of the anchor portion, and flexible strips that are respectively connected to the pillars and projected outward therefrom. The pillars are configured to be flexed about proximal ends thereof in a direction in which the pillars can intersect with each other. The flexible strips are configured to engage a periphery of the insertion hole formed in the subject member when the anchor portion is inserted into the insertion hole, so as to hold the anchor portion on the subject member with a retention force. The pillars can be applied with a flexing force when an extraction force greater than the retention force of the anchor portion is applied to the anchor portion, so as to be flexed in the direction in which the pillars can intersect with each other.

Preferably, the pillars can be further flexed when the extraction force applied to the anchor is increased to be greater than a predetermined value, so that the flexible strips can be disengaged from the periphery of the insertion hole of the subject member.

According to this embodiment, when the anchor portion is applied with the removal or extraction force greater than the retention force thereof, the pillars can be flexed in the direction in which the pillars can intersect with each other. As a result, the flexible strips can be disengaged from the periphery of the insertion hole, so that the anchor portion can be easily removed from the insertion hole. As a result, when the anchor portion is extracted from the insertion hole, the flexible strips of the anchor portion can be effectively prevented from being abraded or worn away even if the clip is made of low-cost resins such as polyacetal (e.g., polyoxymethylene (POM)). Therefore, the retention force of the anchor portion cannot be decreased from an initial value (a designed value) even if the clip is repeatedly used.

Optionally, the pillars respectively have engagement projections that are engageable with each other when the pillars are flexed in the direction in which the pillars can intersect with each other. The engagement projections can clear one another when the flexing force applied to the pillars is increased to be greater than a predetermined value.

The pillars connected to each other via a connecting portion that is capable of being broken when the pillars are flexed in the direction in which the pillars can intersect with each other.

Other objects, features and advantages of the present invention will be readily understood after reading the following detailed description together with the accompanying drawings and the claims.

DETAILED DESCRIPTION OF THE INVENTION

Figure 1:
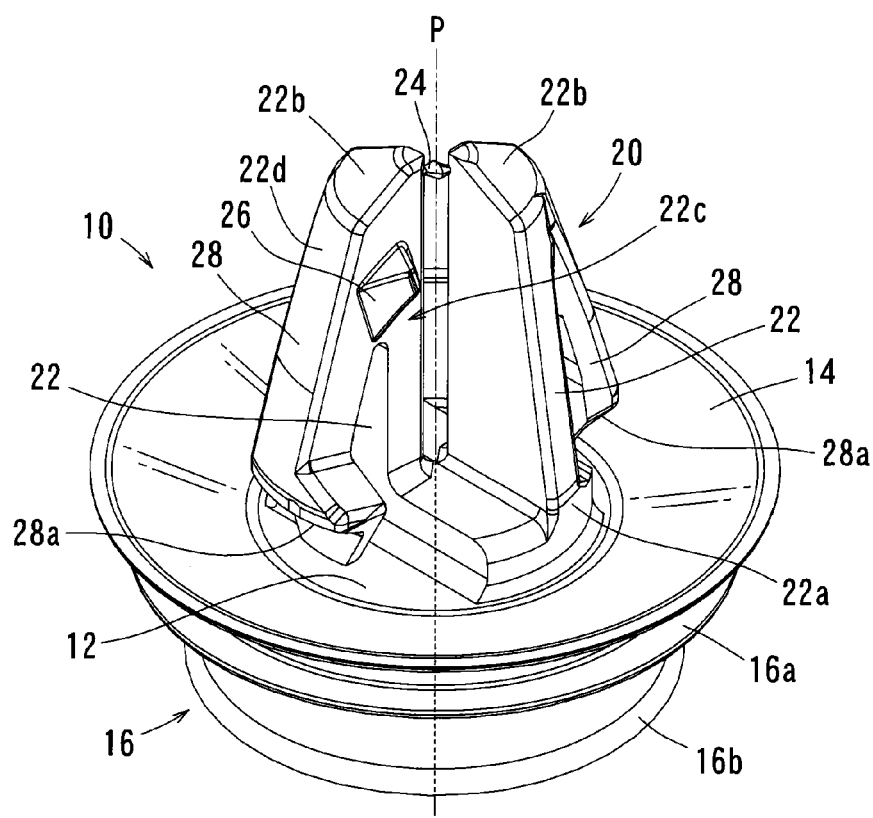
FIG. 1 is a perspective view of a clip according to a representative embodiment of the present invention.

A detailed representative embodiment of the present invention will be described with reference to FIGS. 1 to 12(B).

As shown in, for example, FIGS. 1 to 4, a representative clip 10 may preferably be integrally formed as a unit by molding of resin such as polyacetal (e.g., polyoxymethylene (POM)). The clip 10 may preferably include a central disk portion 12, a lower connecting portion 16 that is extended downwardly from a lower surface of the disk portion 12, and an upper anchor portion 20 that is projected upwardly from an upper surface of the disk portion 12. The disk portion 12 has an annular elastically deformable portion, so as to form a dish-shaped stabilizer 14.

The connecting portion 16 is a portion that is used to attach the clip 10 to a trim board (not shown) as an attaching member. In particular, the connecting portion 16 may preferably include an upper (first) flange 16a, a lower (second) flange 16b, and a circular cylindrical neck portion 16c. The neck portion 16c is positioned between the upper and lower flanges 16a and 16b and has a reduced diameter corresponding to a diameter of an engagement slot or hole formed in an attaching portion of the trim board. The connecting portion 16 thus constructed is capable of being connected to the trim board while the attaching portion of the trim board is interleaved between the upper flange 16a and the lower flange 16b thereof. Thus, the clip 10 can be attached to or integrated with the trim board.

The anchor portion 20 is projected upwardly from a central portion of the disk portion 12 (the stabilizer 14). The anchor portion 20 is configured to be inserted into an insertion hole 32 formed in a (vehicle) body panel 30 (FIG. 4) as a subject member, so as to be retained in the insertion hole 32. Thus, the clip 10 can be attached to the body panel 30. Upon attachment of the clip 10 to the body panel 30, the trim board can be attached to the body panel 30 via the clip 10.

As will be appreciated, a plurality of clips and insertion holes are generally used in order to attach the trim board to the body panel 30. However, each one (the clip 10 and the insertion hole 32) of the clips and the insertion holes will be described in this description.

Figure 3:
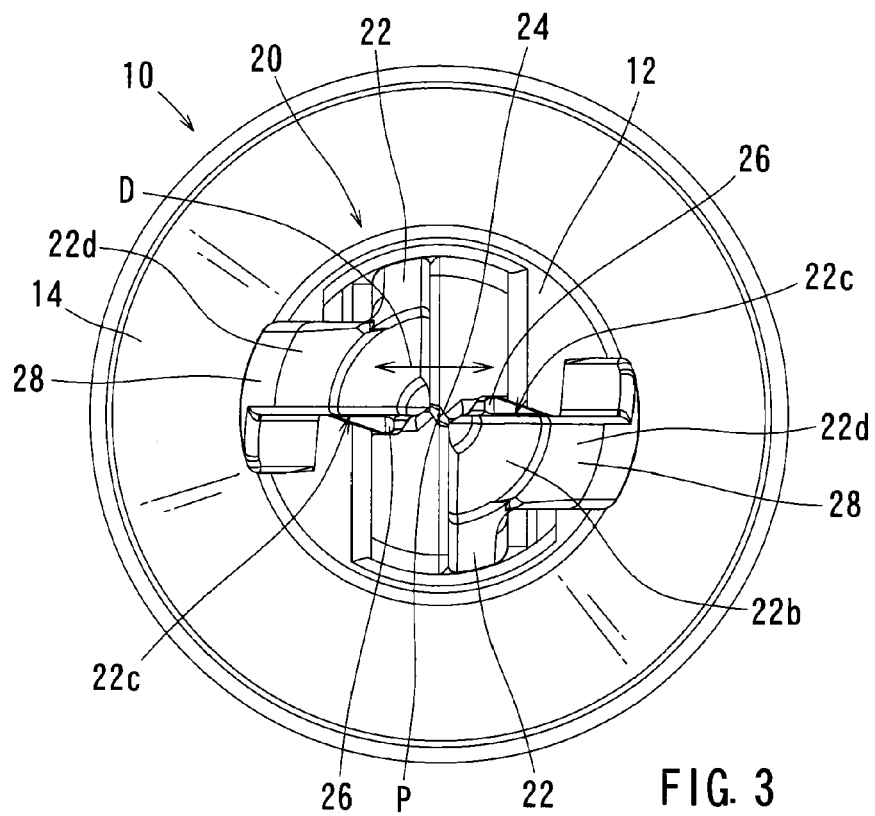
FIG. 3 is a plan view of the clip.

The anchor portion 20 may preferably include a pair of (two) pillars 22 and a pair of (two) flexible strips 28 respectively connected to the pillars 22. As best shown in FIG. 3, the pillars 22 (which may be referred to as first and second pillars 22) are positioned diametrically opposite to each other at a distance in plan. In other words, the pillars 22 are positioned symmetrical about an axis P of the anchor portion 20 at a distance in plan. Each of the pillars 22 has a lower proximal end 22a that is integrated with the disk portion 12, and an upper distal end 22b (a free end). Further, the pillars 22 are shaped to be flexed about the proximal ends 22a thereof in a predetermined diametrical direction D of the anchor portion 20 (a direction in which the pillars 22 can intersect with each other).

As best shown in FIG. 3, the distal end 22b of each of the pillars 22 has a substantially fan shape in cross section, so as to have a vertical flat side surface 22c and a curved convex surface 22d. The pillars 22 are positioned such that the convex surfaces 22d formed in the distal end 22b are faced outwardly. Further, the pillars 22 are arranged to not be interfered with each other when the pillars 22 are flexed in the diametrical direction D. In particular, the pillars 22 are arranged to move relative to each other while the corresponding side surfaces 22c thereof are closely faced to each other when the pillars 22 are flexed.

Figure 2:
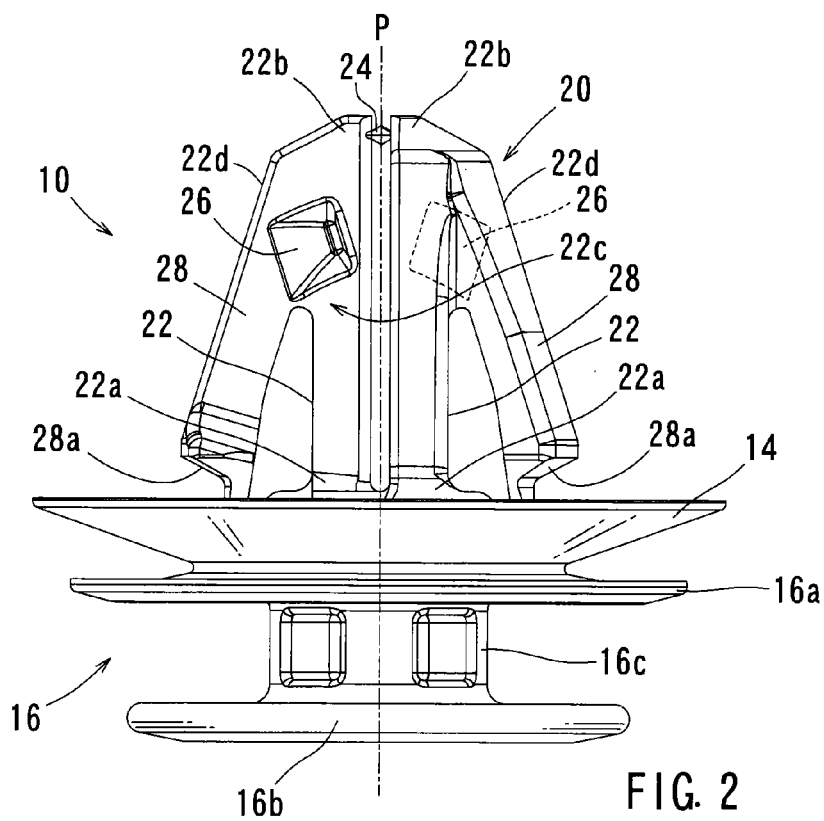
FIG. 2 is an elevational view of the clip.

Further, as shown in, for example, FIGS. 2 and 3, the pillars 22 respectively have engagement projections 26 that are respectively formed in the side surfaces 22c thereof. The engagement projections 26 are arranged and constructed to contact (interfere with) and engage each other when the pillars 22 are flexed in the diametrical direction D over a desired range, which will be hereinafter described.

Further, as shown in, for example, FIG. 1, the distal ends 22b of the pillars 22 are connected to each other via a connecting strip 24 (a connecting portion), so that the pillars 22 can be prevented from being flexed in the diametrical direction D. However, the connecting strip 24 is shaped to be relatively easily broken when a predetermined force is applied thereto. Therefore, the connecting strip 24 may be referred to as a weakened portion, which will be hereinafter described.

Figure 4:
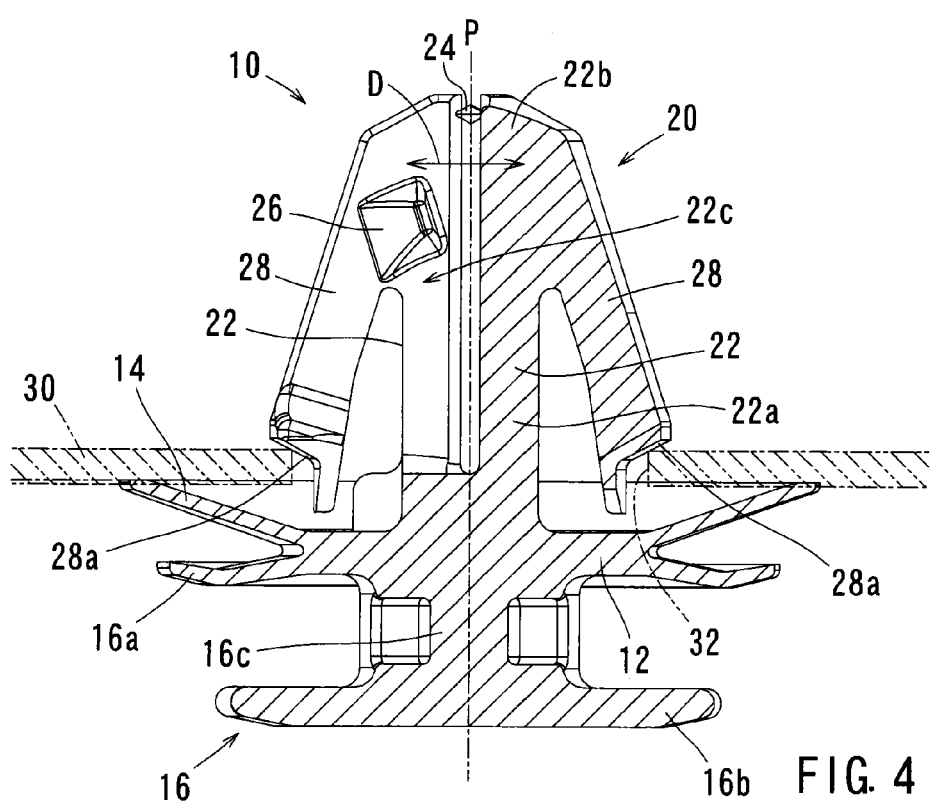
FIG. 4 is a partially cross-sectional elevational view of the clip, which view illustrates a condition in which the clip is attached to a subject member.

Conversely, as best shown in FIG. 1, the flexible strips 28 are respectively connected to the distal ends 22b of the pillars 22. In particular, as best shown in FIG. 4, the flexible strips 28 are respectively projected obliquely downward and outward from the distal ends 22b of the pillars 22 in the diametrical direction D. That is, the flexible strips 28 are respectively formed as cantilevered strips each of which has a proximal end integrated with the distal end 22b of the pillar 22 and a distal end (a free end). Therefore, each of the flexible strips 28 can flex inward and outward about the proximal end thereof in the diametrical direction D. Further, each of the flexible strips 28 has an engagement surface (portion) 28a that is formed in the free end thereof. The engagement surface 28a of each of the flexible strips 28 is configured to engage a periphery of the insertion hole 32 formed in the body panel 30 when the anchor portion 20 is inserted into the insertion hole 32.

Next, a method of using the clip 10 will now be described in detail.

Figure 5:
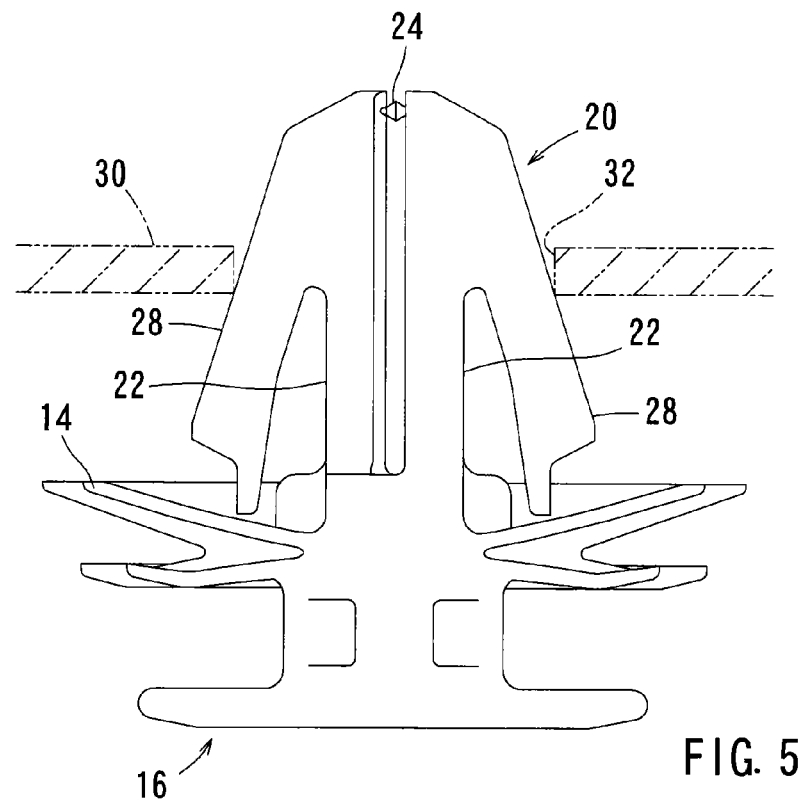
FIG. 5 is a simplified elevational view of the clip, which view illustrates an initial stage of an insertion process of the clip (an anchor portion thereof)
Figure 6:
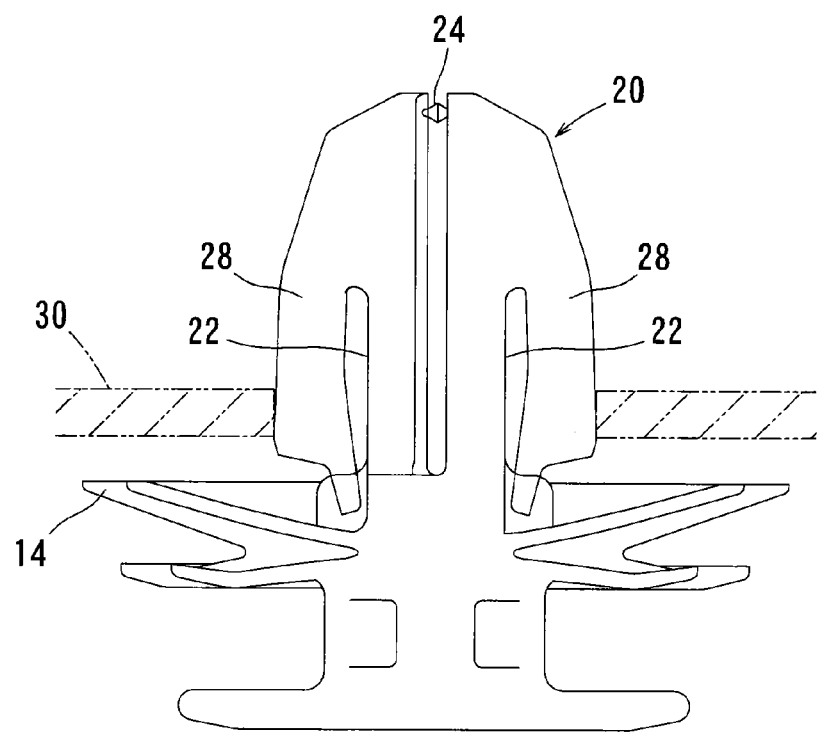
FIG. 6 is a simplified elevational view of the clip, which view illustrates a middle stage of the insertion process of the clip.
Figure 7:
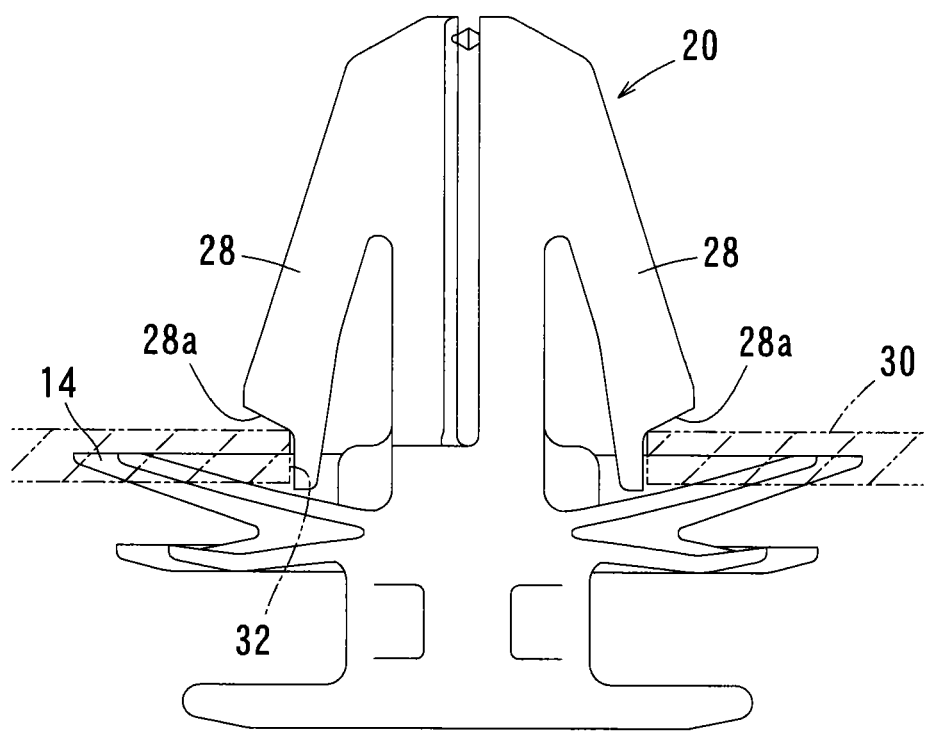
FIG. 7 is a simplified elevational view of the clip, which view illustrates a final stage of the insertion process of the clip (i.e, a condition in which the clip is attached to a subject member)

First, in order to attach the trim board to the body panel 30, the connecting portion 16 of the clip 10 is connected to the attaching portion of the trim board (not shown), so as to attach the clip 10 to the trim board. Subsequently, the anchor portion 20 of the clip 10 is inserted into the insertion hole 32 formed in the body panel 30 (FIG. 5). Upon insertion of the anchor portion 20, the anchor portion 20 passes through the insertion hole 32 while the flexible strips 28 are respectively flexed inward about the proximal end thereof (FIG. 6). When the anchor portion 20 is completely inserted into the insertion hole 32, the flexible strips 28 of the anchor portion 20 are respectively restored outward, so that the engagement surfaces 28a of the flexible strips 28 can engage the periphery of the insertion hole 32 (FIG. 7). Thus, the anchor portion 20 (the clip 10) can be attached to the body panel 30 with a desired retention force. As a result, the trim board can be attached to the body panel 30 via the clip 10.

Figure 8A:
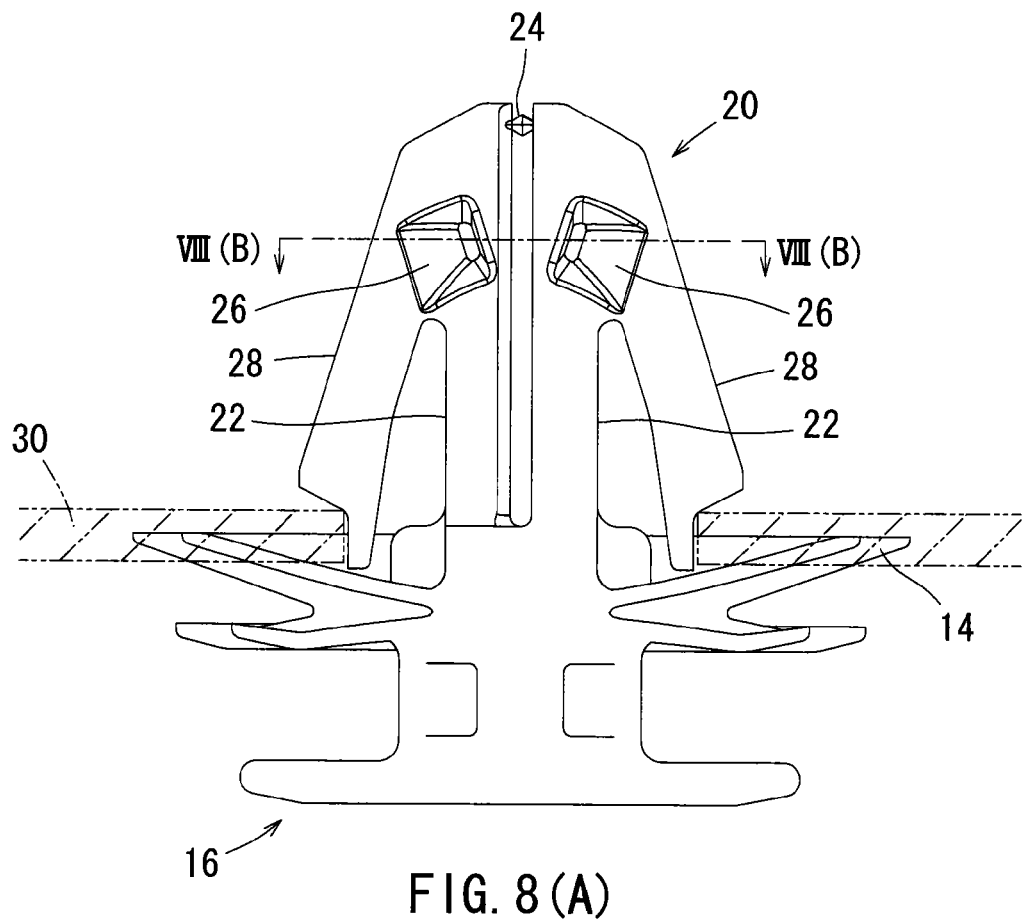
FIG. 8(A) is a simplified elevational view of the clip, which view illustrates a condition in which an extraction process of the clip is started.
Figure 8B:
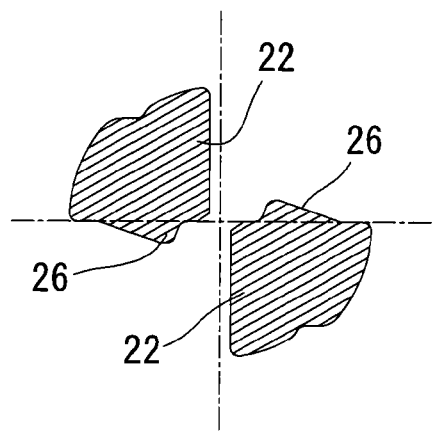
FIG. 8(B) is a cross-sectional view taken along line VIII (B)-VIII(B) of FIG. 8(A)
Figure 9:
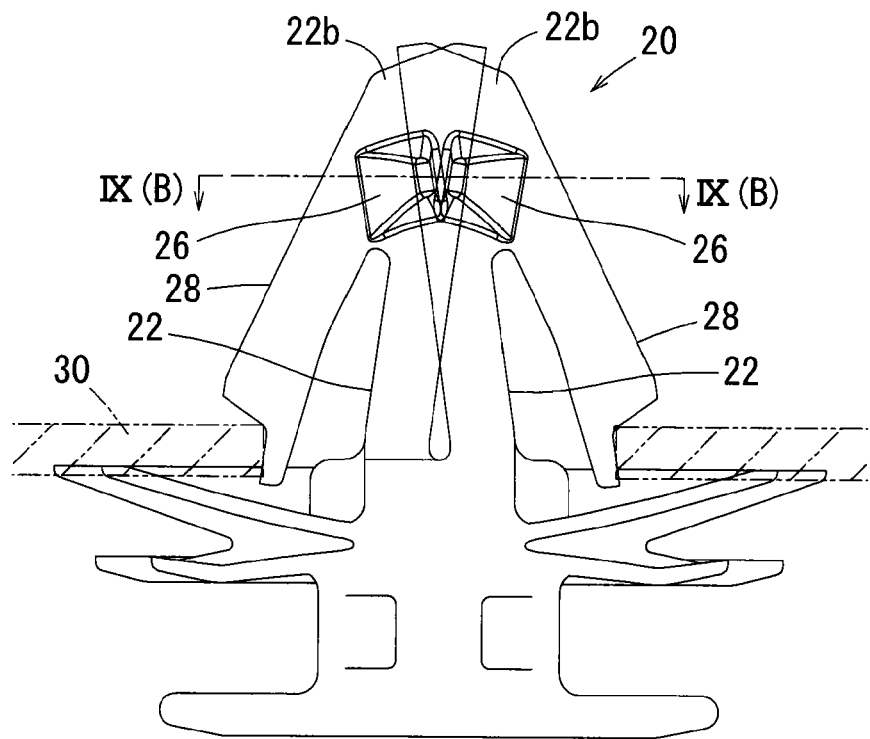
FIG. 9(A) is a simplified elevational view of the clip, which view illustrates a first stage of the extraction process of the clip.
FIG. 9(B) is a cross-sectional view taken along line IX(B)-IX(B) of FIG. 9(A)
Figure 9:
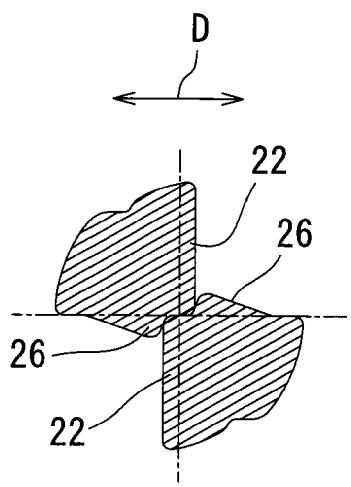

To the contrary, in order to detach the trim board from the body panel 30, in a condition in which the clip 10 is attached to the body panel 30 (FIG. 8(A) which corresponds to FIG. 7), the anchor portion 20 (the clip 10) can be applied with a removal or extraction force greater than the retention force thereof. Further, in this condition, the pillars 22 has a positional relation shown in FIG. 8(B). Upon application of the extraction force to the anchor portion 20, the extraction force can be transmitted to the pillars 22 via the flexible strips 28, so that the pillars 22 (the distal ends 22b) can be pressed inwardly (i.e., the pillars 22 can be applied with a flexing force). As a result, as shown in FIG. 9(A), the connecting strip 24 connecting the distal ends 22b of the pillars 22 can be broken, so that the pillars 22 can be flexed inwardly in the diametrical direction D. In this condition, the pillars 22 have a positional relation shown in FIG. 9(B). That is, the pillars 22 can be interfered with each other via the engagement projections 26 formed therein.

Figure 10A:
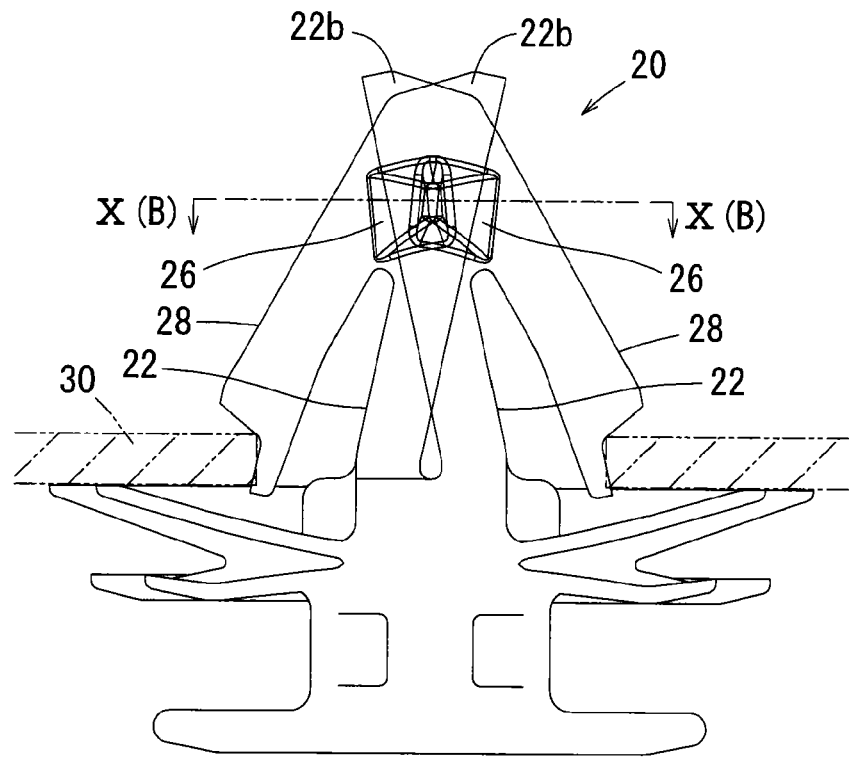
FIG. 10(A) is a simplified elevational view of the clip, which view illustrates a second stage of the extraction process of the clip.
Figure 10B:
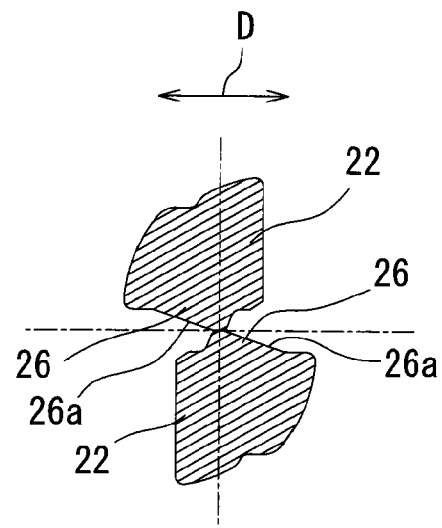
FIG. 10(B) is a cross-sectional view taken along line X(B)-X(B) of FIG. 10(A)
Figure 11:
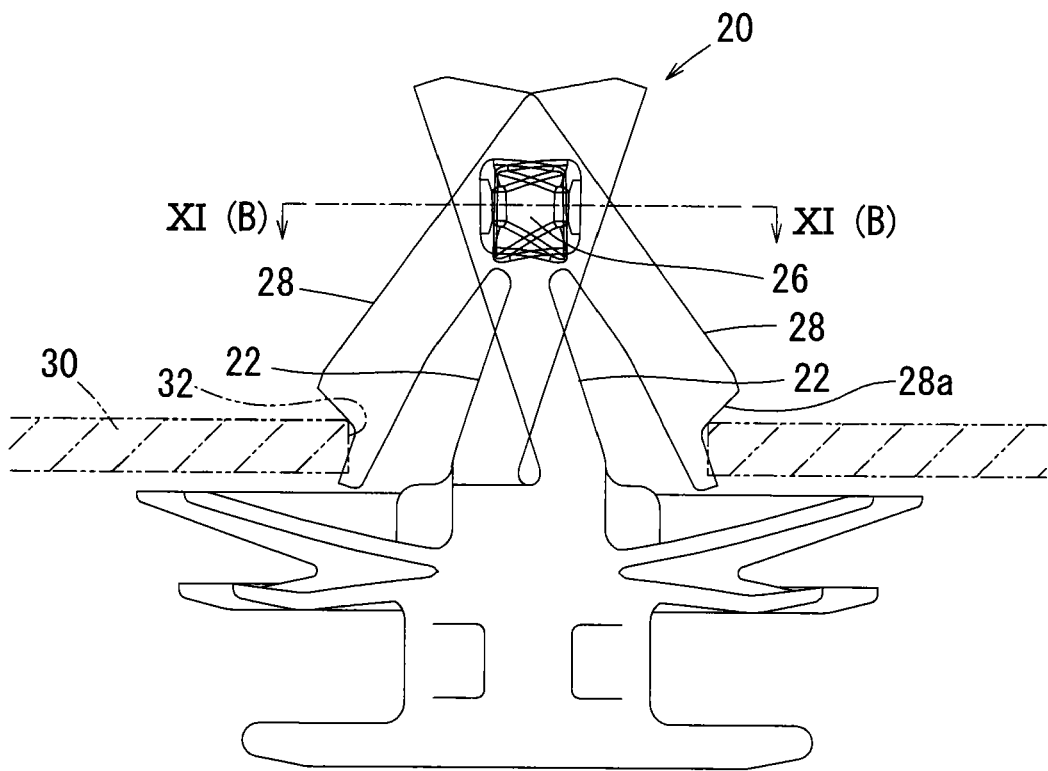
FIG. 11(A) is a simplified elevational view of the clip, which view illustrates a third stage of the extraction process of the clip.
FIG. 11(B) is a cross-sectional view taken along line XI(B)-XI(B) of FIG. 11 (A)
Figure 11:
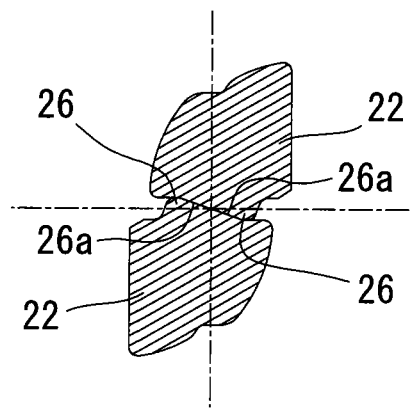
Figure 12:
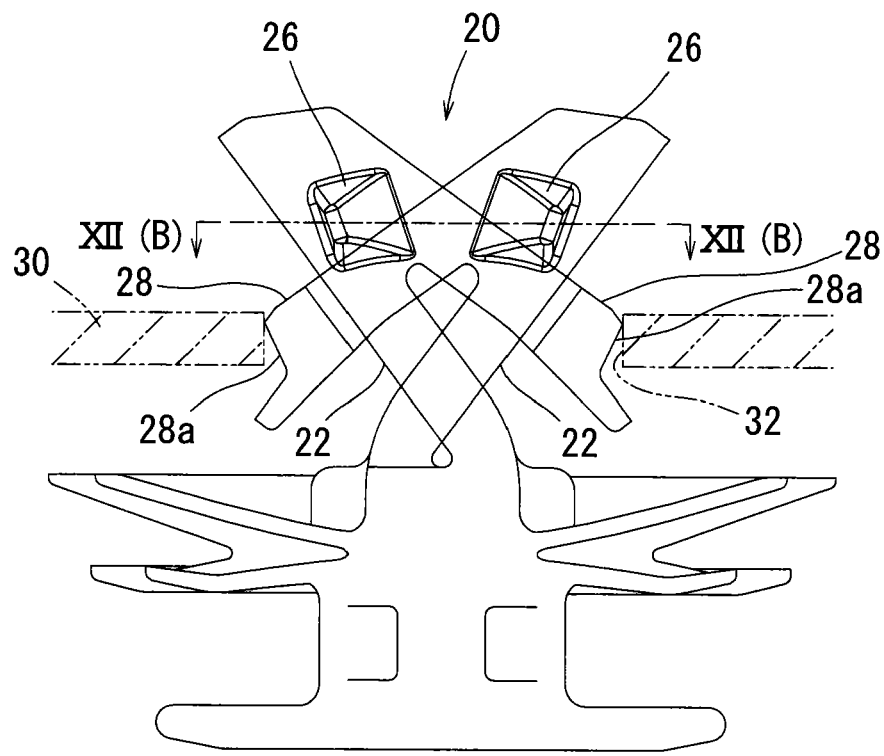
FIG. 12(A) is a simplified elevational view of the clip, which view illustrates a final stage of the extraction process of the clip.
FIG. 12(B) is a cross-sectional view taken along line XII (B)-XII(B) of FIG. 12(A).
Figure 12:
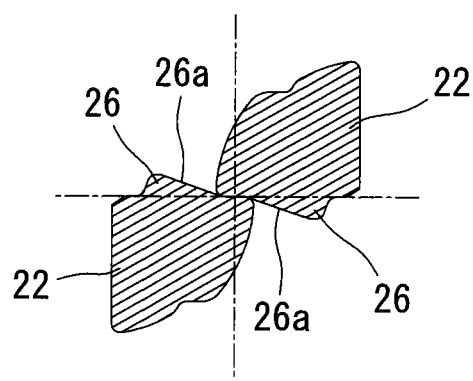

Subsequently, when the extraction force applied to the anchor portion 20 (the flexing force applied to the pillars 22) is increased to be greater than a predetermined value, the pillars 22 can be further flexed inwardly (FIG. 10(A)). As a result, the engagement projections 26 formed in the pillars 22 can engage (interfere with) each other and then clear (climb over) one another (FIG. 10(B)).

When the pillars 22 are further flexed inwardly (FIG. 11(A)), the engagement projections 26 formed in the pillars 22 can move or slide while trailing guide surfaces 26a thereof contact each other. In this condition, the pillars 22 have a positional relation shown in FIG. 11(B). As shown in FIG. 11(A), in this condition, the engagement surfaces 28a of the flexible strips 28 are still engage the periphery of the insertion hole 32, so that the anchor portion 20 (the clip 10) can be held in the body panel 30.

When the pillars 22 are further flexed inwardly (FIG. 12(A)), the engagement projections 26 formed in the pillars 22 can be disengaged from each other. In this condition, the pillars 22 have a positional relation shown in FIG. 12(B). As shown in FIG. 12(A), in this condition, the engagement surfaces 28a of the flexible strips 28 are disengaged from the periphery of the insertion hole 32 of the body panel 30, so that the anchor portion 20 (the clip 10) can be removed from the insertion hole 32 of the body panel 30.

Thus, according to the clip 10 thus constructed, the anchor portion 20 can be extracted from the insertion hole 32 of the body panel 30 after the engagement surfaces 28a of the flexible strips 28 are disengaged from the periphery of the insertion hole 32. As a result, when the anchor portion 20 (the clip 10) is extracted from the insertion hole 32 of the body panel 30, the flexible strips 28 of the anchor portion 20 can be effectively prevented from being abraded or worn away. Therefore, even if the clip 10 is made of low-cost resins such as polyacetal (e.g., polyoxymethylene (POM)), the flexible strips 28 of the anchor portion 20 cannot be easily abraded or worn away by repeated-use of the clip 10. Thus, the retention force of the anchor portion 20 cannot be decreased from an initial value (a designed value) even if the clip 10 is repeatedly used (i.e., even if the anchor portion 20 is repeatedly inserted into and extracted from the insertion hole 32).

Further, the pillars 22 cannot be flexed inwardly before the anchor portion 20 (the clip 10) is applied with the extraction force greater than the retention force thereof because the pillars 22 are connected to each other by the connecting strip 24. Therefore, the anchor portion 20 can maintain the retention force unless the extraction force greater than the retention force thereof is applied thereto. As a result, the trim board can be prevented from being detached or removed from the body panel 30 unless the extraction force greater than the retention force of the anchor portion 20 is applied to the anchor portion 20.

Further, the flexible strips 28 of the anchor portion 20 can be relatively easily flexed inward because the flexible strips 28 are respectively formed as the cantilevered strips. Therefore, even if the insertion hole 32 of the body panel 30 has a burr formed therein, the anchor portion 20 can be easily and smoothly inserted into the insertion hole 32 by applying a relatively small insertion load.

Naturally, various changes and modifications may be made to the present invention without departing from the scope of the invention. For example, in the embodiment, the anchor portion 20 has the two pillars 22 (the first pillar 22 and the second pillar 22) and the two flexible strips 28. However, the number of the pillars 22 (the flexible strips 28) is not limited to two. That is, at least one of the first and second pillars 22 can include two or more pillars.

Further, in the embodiment, the flexible strips 28 are respectively formed as the cantilevered strips. However, the distal ends of the flexible strips 28 can be connected to the pillars 22 or the disk portion 12 as necessary. Further, the flexible strips 28 can be formed as flexible members that are integrated with the pillars 22.

In addition, in the embodiment, the engagement projections 26 are respectively formed in the pillars 22. The engagement projections 26 can be replaced with a single engaging projection that is formed in one of the pillars 22 (the first pillar 22) so as to be engageable with the other of the pillars 22 (the second pillar 22). Further, the engagement projections 26 can have elasticity, so as to elastically engage each other.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A clip, comprising:
a base portion, and
an anchor portion that is configured to be inserted into an insertion hole formed in a subject member, the anchor portion having at least a pair of pillars that are separately formed in the base portion so at to be positioned across an axis of the anchor portion, and flexible strips that are respectively connected to distal ends of the pillars so as to be projected outward therefrom toward the base portion,
wherein the flexible strips respectively have engagement surfaces formed in distal ends thereof that are configured to engage a periphery of the insertion hole of the subject member,
wherein the pillars are offset from each other and are configured to flex about proximal ends thereof in a flexing direction so as to intersect with each other as viewed in a direction perpendicular to the flexing direction,
wherein the pillars respectively have side surfaces extending along the flexing direction thereof, and engagement projections formed in the side surfaces, and
wherein, when the pillars are flexed in the flexing direction, the side surfaces thereof contact each other and the pillars are displaced away from each other in the direction perpendicular to the flexing direction due to engagement of the engagement projections.

2. A clip, comprising:
a base portion, and
an anchor portion that is configured to be inserted into an insertion hole formed in a subject member, the anchor portion having at least a pair of pillars that are separately formed in the base portion so at to be positioned across an axis of the anchor portion, and flexible strips that are respectively connected to distal ends of the pillars so as to be projected outward therefrom toward the base portion,
wherein the flexible strips respectively have engagement surfaces formed in distal ends thereof that are configured to engage a periphery of the insertion hole of the subject member so as to hold the anchor portion on the subject member with a retention force,
wherein the pillars are offset from each other and connected to each other via a connecting portion,
wherein, when an extraction force greater than the retention force is applied to the anchor portion, the connecting portion is configured to be broken so that the pillars can be flexed about proximal ends thereof in a flexing direction so as to intersect with each other as viewed in a direction perpendicular to the flexing direction.

* * * * *